United States Patent Office 3,191,053
Patented June 22, 1965

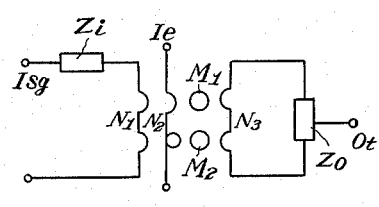
Fig. 1.
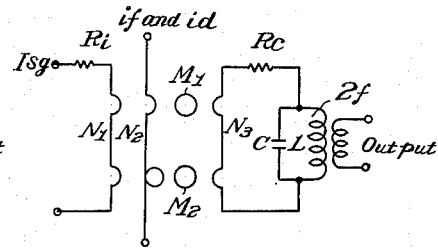
Fig. 3.
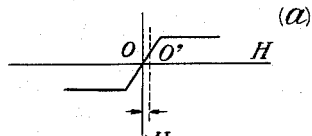
Fig. 2.
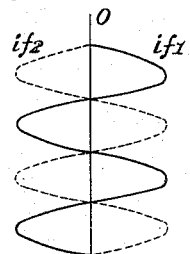
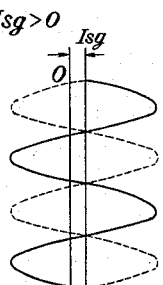
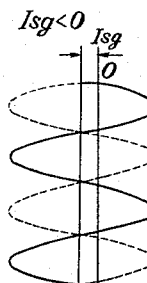
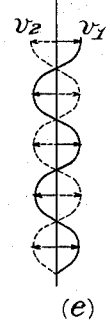
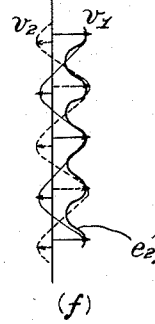
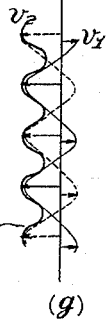

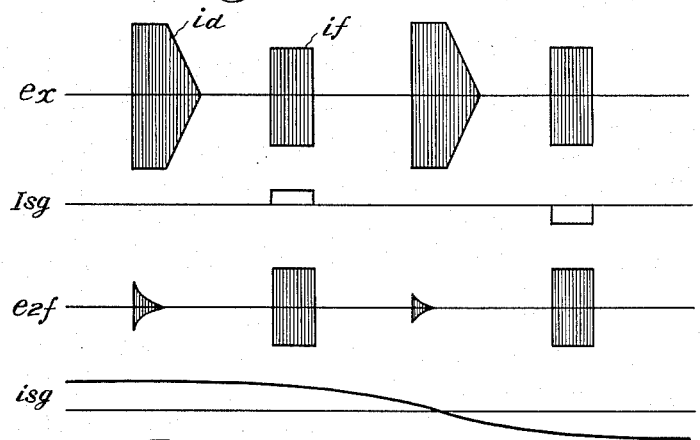
*Fig. 4.*
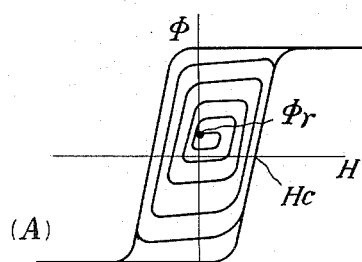
*Fig. 5.*
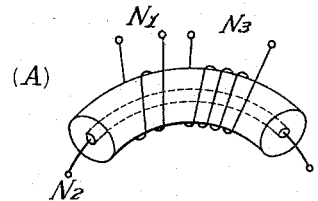
*Fig. 6.*
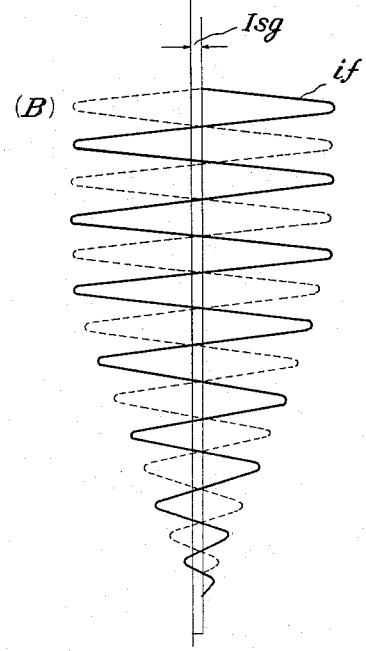
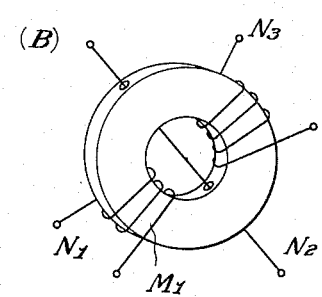

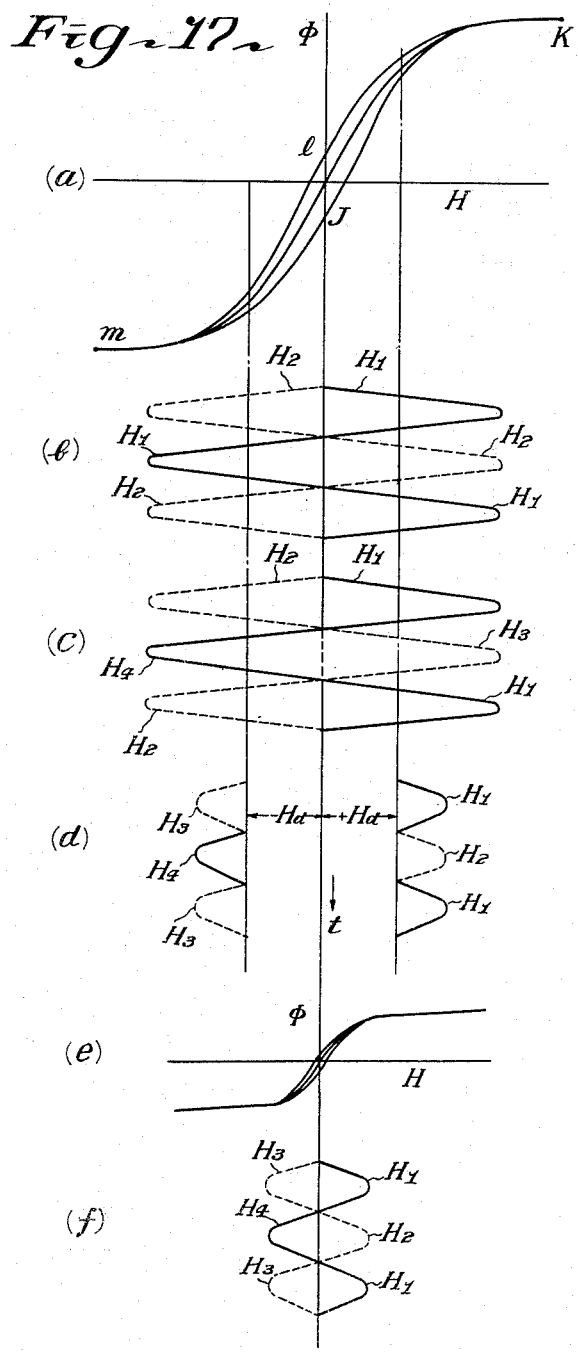
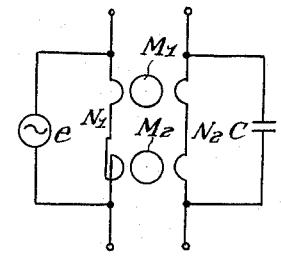

3,191,053
SIGN DETECTING SYSTEM
Shintaro Oshima, Tokyo-to, Hajime Enomoto, Ichikawa-shi, and Shiyoji Watanabe and Yasuo Koseki, Tokyo-to, Japan, assignors to Kokusai Denshin Denwa Kabushiki Kaisha, Tokyo-to, Japan
Filed Aug. 19, 1960, Ser. No. 50,689
6 Claims. (Cl. 307—88)

The present invention relates to a sign detecting system, more particularly to a system for detecting the plus or minus polarity of the difference between a direct-current input signal and a direct-current reference signal by the use of non-linear elements having substantially a symmetrical hysteresis characteristic with respect to its original point as ferro-magnetic cores or ferro-electric material.

In the above-mentioned system, it is necessary for precisely detecting the polarity of an electric signal that a detecting means including the non-linear elements is unaffected by the preceding polarization of the non-linear elements even if the hysteresis of said polarization has passed along any course. This fact is most important for the sign detecting circuit. Hence, it is necessary for constructing a precise analogue-digital converter to select only non-linear elements each having an original point which has no relation to the prior hysteresis of the polarization. The original point will be denoted hereinafter as "zero point."

The drift of the zero point makes it difficult to obtain an analogue-digital converter having great accuracy.

The present invention further relates to a system for converting the sign of a direct-current signal to an alternating-current high frequency signal having a "0 phase" or "$\pi$ phase." It has been well-known, in one of such systems as described, above, to employ a magnetic amplifier obtaining a double frequency of the energizing current thereof. In this magnetic amplifier, however, when a relatively large direct-current passes through the amplifier, a residual magnetism will be created in the core or cores of the magnetic amplifier by the direct-current due to the hysteresis characteristic of the magnetic core, and the residual magnetism will remain in the magnetic core or cores for a long time. This defective characteristic appears always in a device using a ferro-magnetic material or ferro-electric material. Hence, it is generally difficult to construct a very precise sign detecting device having a very stable zero point.

An essential object of the present invention is to obtain a very precise sign detecting circuit having a very stable zero point.

The novel features which are believed to be characteristics of the present invention are set forth with particularity in the appended claims, but the present invention, both as to its construction and manner of operation, together with further objects and advantages thereof, may be understood by reference to the following description taken in conjunction with the accompanying drawings, in which the same members are indicated by the same numerals, and in which:

FIG. 1 is a connection diagram for describing the principle of the present invention;

FIG. 2 is a characteristic curve and wave diagram for describing the operation of the circuit shown in FIG. 1;

FIG. 3 is a connection diagram of one example of the present invention;

FIG. 4 is a wave diagram for showing an example of control time chart for describing the operating principle of the system of the present invention;

Figure 8:
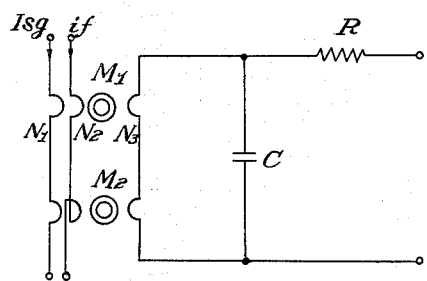
Figure 9:
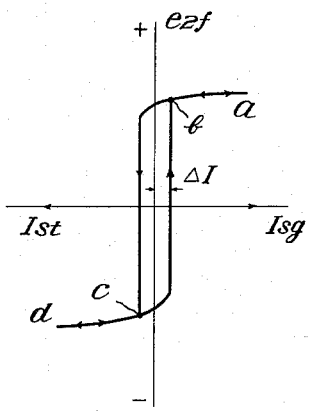
Figure 10:
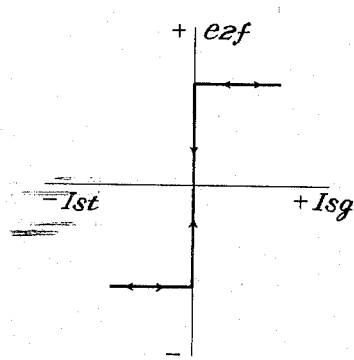
Figure 11:
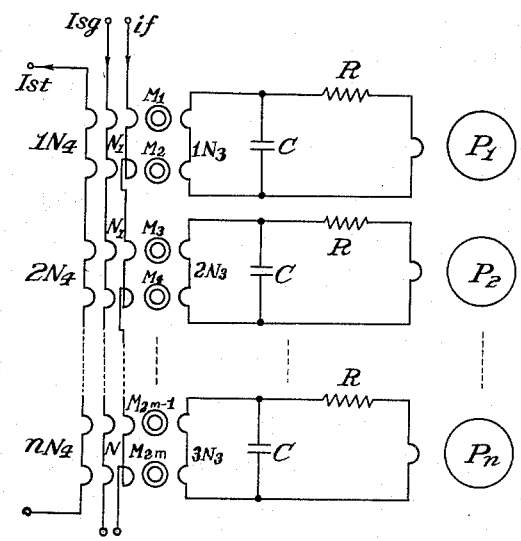
Figure 7:
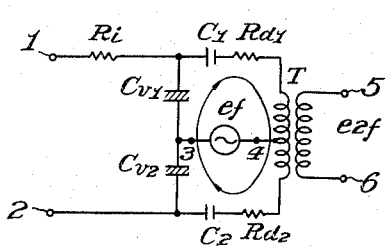
Figure 12:
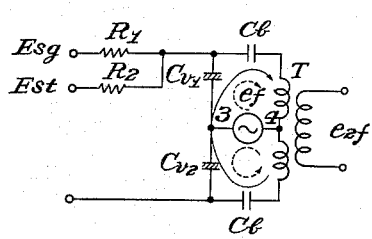
Figure 13:
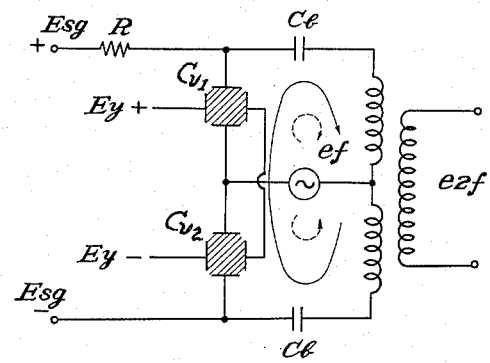
Figure 14:
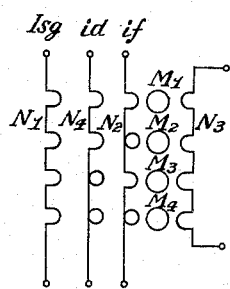
Figure 15:
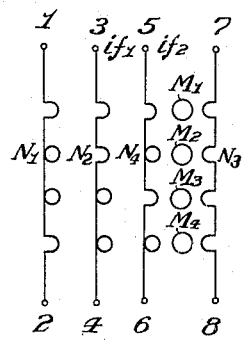
Figure 18:
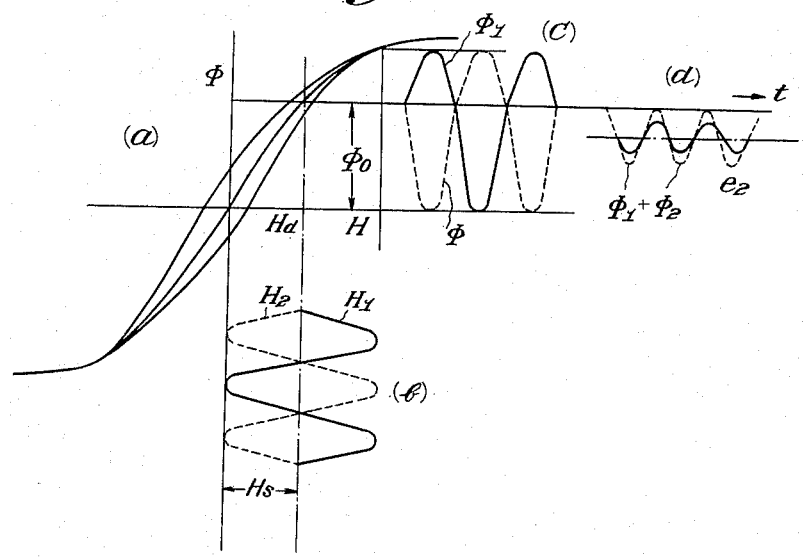
Figures 19, 20:
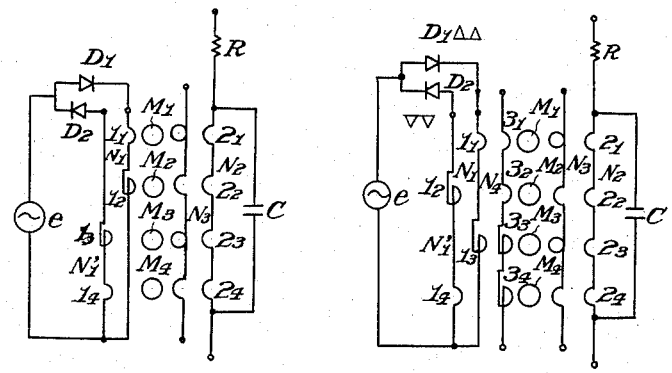

FIGS. 5 (A) and (B) are characteristic curves for describing an operation principle of the system of the present invention;

FIGS. 6 (A) and (B) are embodiments of windings wound on magnetic cores to be used in the embodiment of the present invention;

FIG. 7 is a connection diagram for showing the other example of the present invention;

FIG. 8 is a connection diagram for showing another example of the present invention;

FIG. 9 is a characteristic curve for describing the operation of the example shown in FIG. 8;

FIG. 10 is a characteristic curve for the describing operation of another example of the present invention;

FIG. 11 is a connection diagram for showing an application of the system of the present invention;

FIG. 12 is a connection diagram of another example of the present invention;

FIG. 13 is a connection diagram for another example of the present invention;

FIGS. 14 and 15 are connection diagrams for showing other examples of the present invention;

FIG. 16 is a connection diagram for describing the principle of the present invention;

FIGS. 17 and 18 are views for showing operation of the system of the present invention in FIG. 16;

FIGS. 19 and 20 are connection diagrams for showing other examples of the present invention.

The principle of the present invention will be first described in connection with FIG. 1. The circuit of FIG. 1 consists of two ferro-magnetic cores $M_1$ and $M_2$, three windings $N_1$, $N_2$ and $N_3$, an input impedance $Z_i$ connected to the winding $N_1$, and an output impedance $Z_o$ connected to the winding $N_3$. Each of the windings $N_1$, $N_2$ and $N_3$ is composed of a coil wound on the magnetic core $M_1$ and another coil wound on the magnetic core $M_2$.

As shown in FIG. 1, the windings $N_1$, $N_2$ and $N_3$ are wound in such a manner that all coils of the windings $N_1$ and $N_3$ are wound on the magnetic cores $M_1$ in the same polarity, and one coil of the winding $N_2$ is wound on the same polarity as that of the coils of the windings $N_1$ and $N_3$ on the core $M_1$ and the other of the winding $N_2$ is wound in the reverse polarity as the windings $N_1$ and $N_3$ on the core $M_2$.

The operation principle for getting an even harmonic frequency of the exciting current is as follows. In the circuit of FIG. 1, let it be assumed that the magnetization characteristics of the cores $M_1$ and $M_2$ are such as shown in FIG. 2(a).

Then, when an input signal current $I_{sg}$ is impressed on the winding $N_1$ and a high frequency exciting current $i_f$ is applied to the winding $N_2$ and the amplitude of the current $i_f$ is sufficiently large enough, to make operation along the major hysteresis loop of the cores $M_1$ and $M_2$ possible, as shown in FIG. 2(b), where the solid line is the wave form of the exciting current $i_{f1}$ for the core $M_1$ and the broken line is the wave form of the exciting current $i_{f2}$ for the core $M_2$.

Then, the output voltages are induced across both of the output coils wound on the cores $M_1$ and $M_2$, respectively, thus inducing an output voltage across the terminals of the winding $N_3$.

The states of the output voltage across the terminals of the winding $N_3$ varies according to the polarity of the input signal current $I_{sg}$. In this case, there are three states.

(i) If $I_{sg}=0$, then, the induced voltages across respectively the output coils of the cores $M_1$ and $M_2$ always are equal amplitude and just opposite phases, so that no voltage is induced across the terminals of the winding $N_3$ as shown in FIG. 2(e).

(ii) If $I_{sg}>0$, then, the induced even harmonic voltage $V_1$ induced across the output coil of the core $M_1$ becomes larger than that of the core $M_2$ and both of the induced voltages are in phase, so that the even harmonic frequency voltages $e_{2f}$ of the exciting current are induced across the terminals of the winding $N_3$ as shown in FIG. 2(f). And in this case, the even harmonic components in the output signal have "0" phase as shown in FIG. 2(f).

(iii) On the contrary, if $I_{sg}<0$, then, the induced even harmonic voltage $V_2$ across the output coil of the core $M_2$ becomes larger than that of the core $M_1$ and both of the induced voltages become in phase, so that the even harmonic voltages $e_{2f}$ of the exciting current are induced across the winding $M_3$, and the even harmonic components of the output voltage have a $\pi$ phase, as shown in FIG. 2(g).

From the above descriptions, the phase of the even harmonic components in the output voltage induced across the winding $N_3$ is completely dependent on the sign of the input signal.

Then, if we detect the phase of the even harmonic components of the output voltage across the winding $N_3$, we can detect the sign of the input signal.

When it is assumed that the magnetic cores $M_1$ and $M_2$ have such B–H characteristic having no hysteresis as shown in FIG. 2 there is no drift of the zero point of the magnetic core. Generally, however, a magnetic substance has a hysteresis characteristic. This hysteresis effect, as shown in FIG. 2, is equivalent to the case wherein a zero point displaced by $\Delta H$ from the prior zero point is taken as the new zero point. The magnetic field intensity $\Delta H$ is due to the effect of the preceding signal. However, if two magnetic cores $M_1$ and $M_2$ are combined in such a manner that the displacements $\Delta H_1$ and $\Delta H_2$ of magnetic field intensities in the magnetic cores $M_1$ and $M_2$ due to their preceding hystereses take the following relations just before the sign detection, then $$\Delta H_1 = \Delta H_2 = 0 \text{ or } \Delta H_1 = -\Delta H_2$$

the resultant displacement $\Delta H$ becomes to $\Delta H_1 + \Delta H_2 = 0$, whereby drift of the zero point can be completely eliminated.

The present invention relates to a new sign detecting system in which the resultant residual magnetism is always made zero just before the sign detection so as to eliminate the above mentioned drift of the zero point by using a setting signal.

Among two conditions ($\Delta H_1 = \Delta H_2 = 0$ or $\Delta H_1 = -\Delta H_2$) for eliminating the resultant residual magnetism, the condition ($\Delta H_1 = \Delta H_2 = 0$) can be obtained by impressing on the cores, a gradually damped alternating magnetic force as a setting signal, having an amplitude which is sufficiently larger than the coercive-force of the magnetic cores just before the sign detection so as to eliminate completely the resultant residual magnetism. Demagnetization is performed through this process. The condition ($\Delta H_1 = \Delta H_2 = 0$) can also be obtained by making the component in the direction of the magnetic field due to input signal current applied to the input winding zero by using a setting signal which is employed to direct the polarity of the residual magnetism towards the direction perpendicular to the magnetic field generated by the input signal current and the output current winding wound on the magnetic cores.

For obtaining the condition ($\Delta H_1 = -\Delta H_2 = H_0$) in the circuit of FIG. 1, it is only necessary to supply both a certain direct-current of a constant value and an alternating current to the exciting winding $N_2$ or to impress transiently a sufficiently large direct current; or alternating current; in such a manner that both of the absolute values of the residual magnetisms of the magnetic cores become the value $H_0$.

In FIG. 3, an input signal winding $M_1$, an exciting winding $N_2$ and an output winding $N_3$ are wound on two ferrite cores $M_1$ and $M_2$ having substantially symmetrical hysteresis characteristics with respect to their original zero points.

The effect of the setting signal in this invention will be explained in connection with FIG. 3, as follows. As we have described above, the setting signal is indispensable for attaining precise detection of a sign, and the setting signal may be an alternating current signal, a direct current signal or a superimposed signal of said alternating current signal and said direct current signal, but for simple explanation we consider only the case where the alternating current signal is used as a setting signal hereafter.

As shown in FIG. 3, the windings $N_1$, $N_2$ and $N_3$ are wound in such a manner that all coils of the windings $N_1$ and $N_3$ are wound on the magnetic cores $M_1$ and $M_2$ in the same polarity, and one coil of the winding $N_2$ is wound in the same polarity as that of the coils of the windings $N_1$ and $N_3$ on the core $M_1$ and the other coil of the winding $N_2$ is wound in the reverse polarity as the windings $N_1$ and $N_3$ on the core $M_2$.

An input signal current $I_{sg}$ is applied to the winding $N_1$ through an input resistor $R_i$, and a demagnetizing signal current $i_d$ having a high frequency $f'$ and an exciting signal current $i_f$ having a high frequency $f$ are successively applied to the winding $N_2$.

A resistor $R_c$ is a coupling resistor, and a capacitor $C$ and an inductor $L$ construct a parallel tuned circuit for a frequency of $2f$.

The output signal having the frequency of $2f$ is led out through the secondary windings of the tuned circuit.

We consider the case where the currents shown in FIG. 4 are applied to the circuit of FIG. 3.

A demagnetization current $i_d$ (referred to as a setting signal in this invention) is a gradually damped high frequency exciting signal, and its peak amplitude is large enough to cover the coercive force of the magnetic core.

According to said setting operation by the current $i_d$ the residual effects of the preceding signals ($\Delta H_1$ and $\Delta H_2$) for cores $M_1$ and $M_2$ become, respectively, zero, and both of the cores $M_1$, $M_2$ are reset to zero point.

Next, the sampled input signal $I_{sg}$ and the exciting current of high frequency $f$ are simultaneously applied to the windings $N_1$ and $N_2$, respectively.

Then as explained with reference to FIG. 2, even harmonic voltages are induced across the winding $N_3$.

In this case only the double frequency component is selectively tuned with the circuit (LC) and the double frequency voltage whose phase corresponds to the polarity of the input signal is obtained at the output terminals through the coupling resistor $R_c$.

The demagnetization is performed by using the setting signal as described above, that is, the deviation $\Delta H$ becomes zero, and when an exciting signal current $i_f$ and the input signal $I_{sg}$ are applied simultaneously to the above-mentioned elements of FIG. 3, the input signal is converted to an even harmonic voltage without any drift of the zero point.

Let it be assumed that the magnetic characteristics of the magnetic cores $M_1$ and $M_2$ are such as shown in FIG. 5(A). Then, when the input signal of direct current $I_{sg}$ is supplied to the winding $N_1$ and the high frequency setting current $i_d$ is supplied to the winding $N_2$, the amplitude of the current $i_d$ being sufficiently large so as to produce a sufficiently larger magnetic field than the coercive force $H_c$ and the attenuation locus of said amplitude describing a gentle envelope such as shown in FIG. 5(B), a residual magnetism $\phi_r$ will remain in the magnetic core $M_1$ when the current $i_f$ becomes zero and the current $I_{sg}$ also becomes zero.

On the other hand, since the current $i_d$ is the reverse phase against the former case relative to the magnetic core $M_2$, an inverse excitation is given to the core $M_2$, as shown in FIG. 5(B) by broken line. However, the polarities of the residual magnetisms of the magnetic cores $M_1$ and $M_2$, are the same to each other because the current $I_{sg}$ is supplied to the cores in the same polarity.

Then, we consider the case where the continuous input signal current $I_{sg}$ is applied to the input signal winding.

The frequency of the input signal $I_{sg}$ is much lower than that of the setting signal frequency and the exciting signal frequency, and is also lower than the repetition cycle of the exciting signal.

After application of the setting signal, both of the cores $M_1$ and $M_2$ are magnetized to a certain magnitude of residual magnetism corresponding to the magnitude of the input signal at the setting period, so that when an exciting signal is applied to the elements, the input signal at the exciting period and the residual magnetism effect induce even harmonic output voltages; then a high accuracy in analogue-digital conversion is attained.

In the case where the sampled input signal is applied to the elements, there is no input signal at the setting period and the setting effect results in no resultant of the preceding input signal and sign detection will be attained at the next sampling period without any drift of the zero point. On the contrary, in the case where the continuous input signal is applied to the elements, a certain magnitude of residual magnetism flux corresponding to the input signal of the setting period remains. That is, the cores $M_1$ and $M_2$ memorize the magnitude of the input signal in the state of residual magnetism, and at the next sampling period the input signal, to be added adding with the said residual magnetism, determines the phase of the even harmonic output voltage more quickly and more precisely in comparison with the case of sampled input signal.

As explained before, there is another method to obtain the condition ($\Delta H_1 = \Delta H_2 = 0$) for the elimination of the residual magnetism of the preceding input signal.

As shown in FIG. 6, the direction of the setting magnetization is perpendicular to the direction of magnetization generated by the input signal current and the excitation signal.

Accordingly, when a direct current pulse signal, whose amplitude is large enough to cover the coercive force in the setting field direction, is applied, at the setting time the residual magnetism of the preceding input signal is effectively eliminated, and there is no drift of the zero point for the next sign detecting period.

For the simplification of the explanation, we describe the case in which, as shown in FIG. 3, a selective resonant circuit LC tuned to a frequency $2f$ which is twice the exciting frequency $f$ is connected in cascade to the output winding $N_3$ through a coupling resistance $R_c$, and an output voltage having frequency $2f$ is led out of the output terminal. In this case also, as described above, the polarity of the output voltage $e_{2f}$ becomes "0" phase or "$\pi$" phase in accordance with the positive or negative polarity of the input current $I_{sg}$, and moreover, when the frequency of the exciting current $i_f$ is selected so as to be sufficiently large in comparison with that of the input signal current $I_{sg}$, and the number of turns of the windings $N_1$ and $N_3$ are suitably selected, a large voltage gain due to the difference between the frequencies of the currents $i_f$ and $I_{sg}$ will be obtained. Accordingly, it is possible to detect the sign of the small signal input current $I_{sg}$ by amplifying and demodulating the output voltage $e_{2f}$. According to the present invention, by supplying a setting signal $i_d$ to the exciting winding before supply of the exciting current $i_f$ and the signal input current $I_{sg}$ so as to establish the intrinsic symmetry of the magnetic element to make the magnetic hysteresis characteristic of said element irrelevant to the magnitude of the residual magnetism, and by detecting the phase displacement of the output voltage $e_{2f}$. By such a method as described above, it is possible to discriminate the polarity of very small input current in a highly precise manner.

The above description relates to the case in which ferro-magnetic elements are used, but the same principle as the above-mentioned magnetic elements can be easily applied to the case in which ferro-electric elements are used in the place of ferromagnetic elements, by exchanging the electric voltage for the electric current. An example of such a case is shown in FIG. 7, in which the circuit consists of the ferroelectric elements $C_{v1}$ and $C_{v2}$ having the same symmetrical nonlinear characteristic, two coupling condensers $C_1$ and $C_2$ having the same capacity, two damping resistors $R_{d1}$ and $R_{d2}$ having the same resistance, an output transformer T of balance type, input terminals 1 and 2, and output terminals 5 and 6, said members being connected as shown in FIG. 7.

In the circuit of FIG. 7 also, such elimination of the residual polarization and establishment of the symmetrical condition of the zero point as in the case in which ferro-magnetic elements are used, can be attained by impressing a depolarizing electric voltage on the terminals 3 and 4, and then by impressing an input voltage and a high frequency exciting voltage, respectively, on the terminals 1, 2, and 3, 4. In this case, an even order higher harmonic voltage of the exciting signal is generated in a closed loop circuit consisting of the members $C_{v1}$—$C_1$—$R_{d1}$—T—$R_{d2}$—$C_2$—$C_{v2}$. The phase of the generated higher harmonic voltages becomes 0 or $\pi$ phase in accordance with the polarity of the input signal, these voltages are led out of the output terminals 5 and 6. In the closed loop circuit, when capacities of the capacitors $C_1$ and $C_2$ and inductance of the primary winding of the transformer T are so selected that the circuit resonates with the second harmonic of the exciting wave, a voltage $e_f$ having frequency $2f$ appears at the output terminals 5 and 6.

The description of FIG. 3 relates to the case in which only the input current $I_{sg}$ and the exciting current $i_f$ having frequency $f$ are supplied, respectively, to the windings $N_1$ and $N_2$. However, besides the currents one high frequency current $i_{fo}$ having frequency $f_o$ may be applied to the winding $N_2$. In this case, a modulation product of frequencies $(f+f_o)$ and $(f-f_o)$ will be obtained out of the output terminals of the winding $N_3$. When one of the modulation components is selectively taken out, it is possible to obtain an electric output voltage having one of two possible phase positions which differ by 180° to each other in accordance with the polarity of the input current $I_{sg}$.

We have described a circuit capable of detecting the polarity of a small, weak signal by utilizing ferro-magnetic or ferro-electric elements having a symmetrical hysteresis characteristic. However, in the circuit, it is possible to obtain an even order higher harmonic oscillation by feeding back a particular even order higher harmonic component to the input signal $I_{sg}$ by means of an internal feedback or an external feedback of the higher harmonic. In this case also, the oscillation phase is controlled by the polarity of the input signal $I_{sg}$, whereby the polarity of the input signal $I_{sg}$ can be discriminated. In the following will be described the case of a second harmonic oscillation. FIG. 8 shows a connection diagram for illustrating the principle of a circuit which can detect the polarity of the input current according to the oscillation such as described above.

The circuit of FIG. 8 consists of a pair of ferro-magnetic cores $M_1$ and $M_2$, an input winding $N_1$, an exciting and setting winding $N_2$, an output winding $N_3$, a capacitor C, and a coupling resistor R. The windings are wound on the cores in such a manner that the winding $N_1$ and $N_3$ are of the same polarity relative to the cores, $M_1$ and $M_2$, the winding $N_2$ has the same polarity as the windings $N_1$ and $N_3$ on the core $M_1$ and the reverse polarity to the core $M_2$, and all the coils of each of the windings are connected in series.

Let it be assumed that a relatively large exciting current $i_f$ is supplied to the winding $N_2$. When input current $I_{sg}$ having a suitable amplitude is supplied to the winding $N_1$, an even order higher harmonic voltage of the exciting current $i_f$ will develop in the winding $N_3$. The phase of said second harmonic voltage is determined by the polarity of the input signal current $I_{sg}$. And if the second harmonic voltage is generated, a second harmonic oscillation will be built up in the output circuit consisting of the winding $N_3$ and the capacitor C. This generation is caused by a so-called parametrical oscillation. The oscillation phase is subjected to the induced voltage. If the input current $I_{sg}$ varies a positive value from a negative value, the oscillation phase of the output second harmonic voltage $e_{2f}$ reverses abruptly as shown in FIG. 9. This fact has been proved by the inventors' experiments.

In FIG. 9, the input current $I_{sg}$ and the second high harmonic output voltage $e_{2f}$ are, respectively, taken on the abscissa and ordinate. In this characteristic curve, the amplitude of the voltage $e_{2f}$ is nearly constant between points $a$ and $b$ or points $c$ and $d$ irrespective of the direction of the current $I_{sg}$, but there is a hysteresis phenomenon between the points $b$ and $c$. The phenomenon is due to the effect of the prior oscillation.

As described before, if the setting signal $i_d$ is applied just before every exciting signal to the winding $N_2$ of the circuit of FIG. 8, said drift of the zero point is eliminated completely, that is, a difference $\Delta I$ between said signals $I_{sg}$ and $I_{st}$ becomes zero in FIG. 9, and we can obtain such an experimental relation between the input signal and the second higher harmonic voltage as shown in FIG. 10.

On the other hand, if such setting signal $i_d$ and the exciting signal $i_f$ as shown in FIG. 4 are applied to the circuit shown in FIG. 8, we can easily realize a highly sensitive and high accurate sign detecting circuit.

As described above, when in the circuit of FIG. 8, an exciting current $i_f$ and an input signal current $I_{sg}$ are supplied, respectively, to the windings $N_2$ and $N_1$, a second high harmonic oscillation the phase of which is controlled by the polarity of the small signal input current $I_{sg}$ is produced in the output winding $N_3$, whereby a second high harmonic voltage of large amplitude is obtained and the oscillation phase of the voltage can be surely controlled by the polarity of the small signal input current $I_{sg}$. The phase of the second high harmonic voltage correlates mainly to the distortion of the symmetry of the nonlinear characteristic of each element and has no relation to the unbalance between two nonlinear elements. Accordingly, variation of the characteristic of each individual nonlinear element has no direct relation to the establishment of the oscillation phase of the second high harmonic voltage, because generated harmonic current components caused by odd high harmonic voltages are very small due to the reason that the output circuit is designed so as to be resonant with only the second high harmonic component.

By the same reason as above, when the resonant frequency of the output circuit is chosen to tune with the frequency $(f+f_o)$ or $(f-f_o)$ in FIG. 8, and the other exciting signal of a high frequency $f_o$ is also applied to the winding $N_2$ at the exciting period, the phase of the output voltage of the frequency $(f+f_o)$ or $(f-f_o)$ is subjected to the polarity of the input signal, and a sign detection of the input signal with high sensitivity and high accuracy is easily obtained.

In the circuit for obtaining a modulation product of two frequencies, the problem that the exciting signal contains even higher harmonic components makes no trouble in the sign detection process, so that the exciting signal has no need of so low a value of the distortion factor with reference to waveform.

The following description is in connection with the case in which any level detection is carried out by utilizing the above-mentioned principle. In this case, one more standard reference signal winding $N_4$ having the same polarity as the input winding $N_1$ is added. This example is shown in FIG. 11, in which windings N, $N_2$ and $N_3$ of a plurality of unit circuits as shown in FIG. 8 are connected respectively in series and each unit circuit is coupled to a respective parametron $P_1$, $P_2$ ... $P_n$. The oscillation frequency of the second high harmonic of the exciting current $i_f$ is selected so as to be equal to the oscillation frequency of the respective parametron. In the circuit of FIG. 11, when a standard direct current $I_{st}$ is supplied to the circuit consisting of standard windings $1N_4$, $2N_4$ ... $nN_4$ of the unit circuits, and a signal input current $I_{sg}$ is supplied to the input winding $N_1$. The coils having the same number of turns and phases of the oscillation frequency in the windings $1N_3$, $2N_3$ ... $nN_3$ coupled with the parametrons $P_1$, $P_2$ ... $P_n$ change successively from —phase to +phase in accordance with the magnitude of the signal current flowing through the input winding $N_1$ with successive increase of the signal input current $I_{sg}$, because the number of turns of the winding $1N_4$, $2N_4$ ... $nN_4$ increase successively in their numerical order. Accordingly, if the oscillation phases (+) and (—) of the parametrons are made to correspond to the binary digit 1 and 0, respectively, the level of the signal can be directly converted to a binary digit.

In the example of FIG. 7, when the standard reference direct current $I_{st}$ is impressed in common on all the unit circuits and effective ampere turns of the windings $1N_4$, $2N_4$ ... $nN_4$ are set so as to be able to vary optionally, for example, by parallel connecting resistors one by one on the winding $1N_4$, $2N_4$ ... $nN_4$, the input current $I_{sg}$ can be converted to a sign signal in any optional relationship. Moreover, in the example of FIG. 11, a large and a small magnitude of the currents $I_{st}$ and $I_{sg}$ are made to correspond, respectively to the 0 phase or the $\pi$ phase of the oscillation frequency and led out of the parametrons. However, magnitudes of the currents $I_{st}$ and $I_{sg}$ can be led out as the positive or negative polarity of a direct current or voltage by synchronous detection of the oscillation phase of the output voltage having frequency $2f$.

The above-mentioned principle can be applied to a detecting circuit utilizing ferroelectric elements. In FIG. 12 is shown a basic circuit for obtaining a frequency doubler by utilizing a parametric oscillation of a a circuit including two ferroelectric elements. The circuit of FIG. 12 consists of two ferroelectric elements $C_{v1}$ and $C_{v2}$, two condensers $C_b$ for choking the standard reference direct current voltage $E_{st}$ and the signal direct current voltage $E_{sg}$, one coupling resistor $R_1$ for impressing the voltage $E_{sg}$ on the elements $C_{v1}$ and $C_{v2}$, the other coupling resistor $R_2$ for impressing the voltage $E_{st}$ on the elements $C_{v1}$ and $C_{v2}$, and a coupling transformer T. When a high frequency control voltage $e_f$ having frequency $f$ is impressed on terminals 3 and 4, an output voltage $e_{2f}$ having frequency $2f$ can be obtained from the secondary winding of the transformer T. In this example, the sequence of the voltage $e_f$ is the same as that shown in FIG. 4(A) except that current is replaced by a voltage. According to the circuit of FIG. 12, as will be well understood from the description concerning the circuits of FIGS. 3, 7 and 8, the phase of the output oscillation voltage $e_{ef}$ can be controlled in accordance with the polarity of the resultant voltage of the voltages $E_{sg}$ and $E_{st}$.

The above-mentioned examples relate to the cases in which a setting operation is indispensable for detecting the sign of the applied input signal without relation to the preceding applied state. However, when the circuit is so constructed that the magnetic induced field due to the input current $I_{sg}$ is perpendicular to the magnetic induced field due to the setting current, and a small signal input current $I_{sg}$ to be detected and an exciting current of large amplitude are supplied after demagnetization of the magnetic field induced due to the preceding input current $I_{sg}$, the phase of the second higher harmonic output voltage can be controlled by the instant current $I_{sg}$. An example of such a circuit as described just above is shown in FIG. 6.

The above-mentioned example relates to the case utilizing ferro-magnetic cores, but the same object can be attained by using ferro-electric elements instead of ferromagnetic elements and by impressing a direct electric field and an alternating electric field on the elements.

In FIG. 13, a frequency doubling oscillation circuit consisting of ferroelectric elements $C_{v1}$ and $C_{v2}$, each having two pairs of control terminals which are perpendicular to each other, condensers $C_b$ and $C_b$ for choking direct current, and a coupling transformer T.

Controlling of the circuit of FIG. 13 can be effectively attained, in the same manner as that of the circuit of FIG. 6.

The above-mentioned level detecting system relates to the case of oscillation, but the same principle may be applied to an amplification or modulation circuit.

In the above description, only one winding is used for applying the exciting signal and the setting signal to non-linear elements. In order to realize a setting action effectively, there are some circuits by which demagnetization is easily and effectively carried out. According to these circuits a greater accuracy for setting the sign of the input signal is easily attained. An example of those circuits is shown in FIG. 14 in which four magnetic cores are used.

In the circuit of FIG. 15, an input signal winding $N_1$, an exciting winding $N_2$, on output winding $N_3$ and a setting winding $N_4$ are wound on four ferro-magnetic cores $M_1$, $M_2$, $M_3$ and $M_4$ so that winding polarities of the coils of all the windings are the same on one core $M_1$; the number of coils having the same polarity is equal to that of the coils having reverse polarity on the other core $M_4$ and the winding polarity of a respective coil of all the windings are reverse on the other cores $M_2$ and $M_3$. The winding polarities of all coils of the windings $N_1$ and $N_3$ are the same and the number of coils having the same polarity are equal to that of the coils having a reverse polarity with respect to the windings $N_2$ and $N_4$.

In the circuit of FIG. 14, there is no linear coupling between the setting signal $i_e$, the exciting signal $i_f$, and the input signal $I_{sg}$ (or output signal), so that the setting action is attained independently of the exciting signal circuit.

FIG. 15 shows an example capable of obtaining a modulated voltage the phase of which differs by 180° in accordance with the polarity of the small or weak input signal. In the circuit of FIG. 15, an input winding $N_1$, an output winding $N_3$, an exciting winding $N_4$ for supplying a high frequency current $i_{f1}$ having frequency $f_1$, and the other exciting winding $N_2$ for supplying the other high frequency current $i_{f2}$ having frequency $f_2$ are wound on four ferro-magnetic cores $M_1$, $M_2$, $M_3$, and $M_4$ so that the winding polarities of the coils of all the windings are the same on one core $M_1$, the number of coils having the same polarity is equal to those having reverse polarity on the other three cores $M_2$, $M_3$ and $M_4$, and the winding polarities of all coils of one winding $N_3$ are the same, and each of the other three windings $N_1$, $N_2$ and $N_4$ consists of coils of positive and negative polarities, the number of coils of positive polarity being equal to that of the coils of negative polarity. Now let it be assumed that the magnetic hysteresis characteristics of the four cores are the same. Then, when the input current $I_{sg}$ and the exciting currents $i_{f1}$ and $i_{f2}$ are simultaneously applied a resultant voltage $e_{f1 \pm f2}$ having frequency $(f_1 \pm f_2)$ is induced at the output terminals 7 and 8 of the output winding $N_3$. The polarity of the voltage $e_{f1 \pm f2}$ is controlled by the polarity of the current $I_{sg}$, because the following relation is established.

$$e_{f1+f2} < I_{sg} \cdot i_{f1} \cdot i_{f2}$$

Now, if only the voltage $e_{f1+f2}$ is selected at the resonant circuit LC through a coupling resistor R, it is possible to discriminate the sign of the input current $I_{sg}$ by detecting the phase of the voltage $e_{f1+f2}$. In this case, since there is a large frequency difference between the voltage $e_{f1+f2}$ and the current $I_{sg}$, discrimination of the polarity of a weak low frequency signal $I_{sg}$ can be attained with a large voltage gain.

The following description is in connection with a system capable of carrying out the above-mentioned operation in a very efficient manner. Recently, systems capable of carrying out amplification or oscillation by parametrical oscillation of particular elements having a nonlinear character have been proposed. In these systems, however, a particular harmonic oscillation, for instance, the second or third harmonic oscillation of the non-linear element, has been generally utilized as the output power. Strictly speaking, when nonlinear dampers are used for obtaining a stable condition unnecessary power is consumed due to the existence of not only a harmonic oscillation lower than an intended order but also unnecessary higher harmonics, whereby the total power efficiency decreases. This disadvantage can be eliminated by the following system which is illustrated in FIG. 16. This illustration relates to a general basis circuit in which two ferromagnetic elements are used, and a harmonic oscillation of double frequency is established by parametrical oscillation of the elements. The circuit includes two ferro-magnetic cores $M_1$ and $M_2$, an exciting winding $N_1$, an output winding $N_2$, and a condenser C connected to the winding $N_2$ in parallel. Now, in the circuit of FIG. 16, when a high frequency electric voltage $e$ is impressed on the exciting winding $N_1$ to cause a parametrical oscillation, a second harmonic of the exciting current is generated in accordance with resonance relative to the inductance of the output winding $N_2$ and the capacitance of the parallel condenser C. That is to say, now, let it be assumed that the hysteresis characteristics of the magnetic cores $M_1$ and $M_2$ take the forms as shown in FIG. 17(a). In this case, when high frequency magnetic fields $H_1$ and $H_2$ such as those shown in FIG. 17(b) are merely added to the winding $N_1$ by the supply of an exciting current from the high frequency voltage $e$, the resultant magnetic field becomes zero because of symmetrical excitation. However, when the other direct current is supplied to the output winding $N_2$ while the voltage $e$ is being impressed on the exciting winding $N_1$ so as to distort the resultant magnetic field by adding a direct magnetic field $H_s$ to the fields $H_1$ and $H_2$, then, as shown in FIG. 18(c), a direct current magnetic flux $\phi$, and second harmonic magnetic fields $\phi$, and $\phi_2$ will appear, whereby the harmonic oscillation of the double frequency of the voltage $e$ such as shown in FIG. 18(d) is produced and, moreover, the phase of the oscillation is controlled to be 0 phase or $\pi$ phase in accordance with the polarity of the direct current supplied to the winding $N_2$, that is, in accordance with the direction of the direct current magnetic field $H_s$ applied to the magnetic cores $M_1$ and $M_2$ (FIG. 18 shows the case, in which said direction is +).

Generally, when a ferromagnetic core is placed in a magnetic field H, the relation between said field H and the magnetic flux $\phi$ occurring in the magnetic core is represented by the following Equation 1.

Where ($\alpha$) and ($\beta$) are non-linear coefficients $$H(\phi) = \alpha\phi + \beta\phi^3 \qquad (1)$$

When, as described above, a parametrical oscillation is established, an approximate value of a parametrical oscillation rate $\rho$ which represents the strength of said oscillation is represented by the following Equation (2).

$$\rho = K \frac{\frac{3\beta}{2}\phi_0\phi_1^2}{\alpha\phi_0 + \beta\left(\phi_0^3 + \frac{3}{2}\phi_0\phi_1^3\right)} \quad (2)$$

wherein $\phi = \phi_0 + \phi_1$, and K is a constant determined by the condition of the circuit. One the other hand, since, in conventional ferro-magnetic or ferroelectric elements, $\alpha \gg \beta$, and a large imaginary power is necessary for the generation of an oscillation. In the ferromagnetic or ferroelectric element having a substantially rectangular hysteresis characteristic, $\alpha > \beta$, and imaginary power is small, but the coercive force $H_c$ is large, so that the hysteresis loss is large, whereby the parametric oscillation of the double frequency of the exciting current is made difficult and the power conversion gain is made small. Accordingly, if it is possible to make $\beta$ large by the use of a ferro-magnetic or a ferro-dielectric body having the character $(\alpha \gg \beta)$, or to diminish $\alpha$ or eliminate $\alpha$, it is possible to make the parametric oscillation rate $\rho$ large. The following example of FIG. 19 is based on the just mentioned consideration.

The circuit of FIG. 19 comprises an input and output winding $N_2$ consisting of four coils which are connected in series and wound, respectively, on four cores $M_1$, $M_2$, $M_3$, and $M_4$ in the same polarity; a first exciting winding $N_1$ consisting of two coils ($1_1$ and $1_2$) which are connected in series, one ($1_1$) of which is wound on the core $M_1$ in the same polarity as the coil ($2_1$) of the winding $N_2$ which is wound on said core $M_1$, and the other coil ($1_2$) is wound on the core $M_2$ in a polarity reverse to that of the coil ($2_2$) of the winding $N_2$ which is wound on the core $M_2$. The coils ($1_1$ and $1_2$) are connected in series. A second exciting winding $N_1'$ consisting of two coils are connected in series, one of which is wound on the core $M_3$ in a reverse polarity to that of the coil of the winding $N_2$ wound on the core $M_3$, and the other of which is wound on the core $M_4$ in the same polarity as that of the coil of the windings $N_2$ wound on the core $M_4$; and a setting winding $N_3$ consisting of two kinds of coils which are connected in series, one kind of which is wound on the cores $M_1$ and $M_3$ in the polarity reverse to that of the coils of the winding $N_2$ which are wound on said cores, and the other kind is wound on the cores $M_2$ and $M_4$ in the same polarity as that of the coils of the winding $N_2$ which are wound on the cores.

In the circuit of FIG. 19, when rectifiers $D_1$ and $D_2$ are connected, respectively, to the windings $N_1$ and $N_1'$ as shown in the drawing, a condenser C is connected in parallel to the winding $N_2$, and an exciting voltage $e$ is impressed to the windings $N_1$ and $N_1'$, the circuit resonates with the second harmonic of the exciting current.

According to the circuit of FIG. 19, two pairs of the magnetic cores $M_1$, $M_2$ and $M_3$, $M_4$ are, alternately excited, as shown in FIG. 17(c) by waves $H_1$, $H_2$, $H_3$, $H_4$ per rectified half wave of the exciting current. However, the resultant magnetic field viewed from the secondary side, that is, from the side of the winding $N_2$ becomes equal to that of FIG. 17(b). Accordingly, when a direct current signal is impressed on the input and output winding $N_2$ by means of the same exciting operation as in the case of FIG. 16, an oscillation of the double frequency of the exciting current the phase of which is controlled to be 0 or $\pi$ in accordance with the polarity of the exciting current will occur.

However, in each magnetic core, only either of the rectified half waves of the exciting current is impressed, and the reverse wave is not impressed, so that a higher order harmonic component that is, the coefficient $\beta$ increases remarkably thereby increasing the parametric excitation rate $\rho$ as will be understood from the Equation 2. Moreover, a loop is described at one side of the hysteresis loop, so that the hysteresis loss decreases remarkably. Accordingly, even when four magnetic cores are used, the hysteresis loss becomes lower than ½ of that of the case (FIG. 16) in which two magnetic cores are used. Furthermore, when each magnetic core is excited in one direction, the apparent residual magnetism is weak. Accordingly, it is possible to control by the application of a setting signal to the winding $N_3$, the phase of the second high harmonic oscillation of the exciting current double frequency by means of a relatively weak direct current, without carrying out demagnetization by supply of a setting signal current.

Of course, it is clear that when a damped oscillation wave is impressed on the winding $N_3$ of FIG. 19 before sign detection operation it is possible to discriminate a further small signal sign.

The above illustration of FIG. 19 relates to a system in which the parametric oscillation factor $\rho$ is forcibly enlarged by enlarging coefficient $\beta$ of the Equation 2. Moreover if the parameter $\alpha$ is decreased, the parametric oscillation can be more effectively attained, as will be clear from the Equation 2. This example is shown in FIG. 20, in which two pairs of the magnetic cores ($M_1$, $M_3$) and ($M_2$, $M_4$) are provided and their winding method is different from the example as shown in FIG. 19. That is, a first exciting winding $N_1$ consists of two coils which are connected in series, one of which is wound on the core $M_1$ is the same polarity as that of the coil of the winding $N_2$ wound on said core $M_1$, and the other of which is wound on the core $M_3$ in the reverse polarity to that of the coil of the winding $N_2$ wound on said core $M_3$. A second exciting winding $N_1'$, consists of two coils which are connected in series, one of which is wound on the core $M_2$ in a reverse polarity to that of the coil of the winding $N_2$ wound on said core $M_2$, and the other of which is wound on the core $M_4$ in the same polarity as that of the coil of the winding $N_2$ wound on said core $M_4$, and a direct current winding $N_4$ for eliminating the linear coefficient $\alpha$ is wound on the cores $M_1$, $M_2$ in the same polarity as the winding $N_2$ and, on the cores $M_3$ and $M_4$, in the reverse polarity relative to the winding $N_2$.

In the example of FIG. 20, when, as in the case of FIG. 19, a half rectified exciting current is supplied to the windings $N_1$ and $N_1'$, respectively, through rectifiers $D_1$ and $D_2$ while a direct current is being supplied to the winding $N_4$, the following condition is established. The coil of the first winding $N_1$ wound on the core $M_1$ is of reverse polarity with respect to that of the core $M_3$, and the coil of the second winding $N_1'$ wound on the core $M_2$ is reverse with respect to that of the core $M_4$, and the coils of the direct current winding $N_4$ wound on the cores $M_3$ and $M_4$ are of reverse polarity with respect to that of the coils of the winding $N_4$ wound on the cores $M_1$ and $M_2$, so that variation of the magnetic field applied to the cores viewed from the input and output winding $N_2$ takes, as shown in FIG. 17(d), such forms obtained by superposing of the direct current magnetic fields $+H_d$ and $-H_d$ on the half wave rectified exciting magnetic fields $H_1$, $H_2$, $H_3$ and $H_4$. Accordingly, if the value of the direct current to be supplied to the winding 4, that is, the intensity of the field $\pm_d$ is suitably selected, this case becomes equivalent to the case in which an exciting magnetic field as shown in FIG. 17(f) is applied to the hysteresis characteristic such as shown in FIG. 17(e), obtained by reducing substantially or eliminating the straight portion of the $\phi - H$ characteristic of FIG. 17(a).

Accordingly, when in this condition a small direct current signal is impressed on the input and output winding $N_2$ so as to distort its symmetry, a second high harmonic oscillation of the exciting current can be produced as in the case of the example of FIG. 17. According to this system, the phase of the oscillation of the second high harmonic can be controlled by impressing a very small direct current signal on the input and output winding $N_2$.

The above description relates mainly to the case in which ferromagnetic elements are used. However, the same result as above can be obtained by using ferroelectric elements, but in this case, it is only necessary to replace electric current and magnetic field respectively by electric voltage and electric field.

As will be understood from the above description, by utilizing only the minor portion of the hysteresis loop, by and carrying out only one-side excitation, it is possible to decrease hysteresis loss and to facilitate non-symmetrical oscillation. Accordingly, this system can be effectively applied to any logical operation, analog digital converter, etc.

All of the above examples relate to cases in which the electric signals to be detected have been sampled. However, the present invention can be applied, with the same effect, to the case in which a continuous electric signal is used.

Now, considering the case in which a continuous input signal current is supplied as a signal current, in each magnetic core, the alternating current for demagnetizing the residual magnetism to set the core becomes an alternating bias current, thus producing a residual magnetism or a magnetic polarization made to correspond to the electric signal to be detected, whereby an alternating output signal, the polarity of which is converted to 0 phase or $\pi$ phase, will be obtained.

In the other cases, the same result will be obtained. That is, even if a large magnetic field is impressed on non-linear element or elements so as to be perpendicular to fields caused by the input signal winding and the output winding, the residual polarization produced by such fields is substantially directed to a direction perpendicular to the field direction of the input winding. Accordingly, in this state, if an input signal and an exciting signal are impressed on such nonlinear element or elements, a mean value of magnetic flux is established in a plus or minus state in accordance with the polarity of the input signal without relation to the preceding hysteresis phenomenon.

Then, when an alternating exciting current $I_e$ of frequency $f$ is supplied after cancelling the resultant residual magnetism or polarization directed to the input signal winding an output winding as described above, an alternating-current output of frequency $2f$ the phase of which becomes 0 phase and $\pi$ phase in accordance with the polarity of the electric signal to be detected will be obtained.

As described in detail above, in the detecting circuit of the present invention, only the symmetrical character of the elements is utilized, and the other conditions have no direct relation to the signal discrimination. Moreover, since symmetricity of the characteristics of the non-linear elements such as a ferromagnetic or ferrodielectric body is not distorted by the outside physical conditions. Instability due to variation of the character of the non-linear element is reduced in comparison with conventional detecting devices, whereby a stable and precise sign detection of a signal can be made possible.

What we claim is:

1. An electric sign detecting system comprising, an even number of non-linear elements each having hysteresis characteristics substantially symmetrical with respect to their original point, input means for applying an input signal to said non-linear elements, setting means for applying to said non-linear elements, prior to the application of the input signal, a setting signal to remove the effect of residual polarizations produced in the non-linear elements by preceding signals applied thereto, a reference standard signal simultaneously with the application of said input signal, exciting means connected for applying to said non-linear elements an alternating-current exciting signal, output means for taking out from said non-linear elements an output signal having a frequency equal to the second high harmonic component of the exciting signal and having one of two possible opposite phases in accordance with an algebraic sign of an algebraic difference between said input signal and said reference standard signal, said output means having tuning means for resonating with said second high harmonic component.

2. An electric sign detecting system as claimed in claim 1, wherein said setting means comprises terminal means for applying an alternating-current signal having a gradually damped termination as said setting signal.

3. An electric sign detecting system as claimed in claim 1, wherein said exciting means comprises exciting terminal means for receiving an alternating-current and a direct current bias signal as said exciting signal.

4. An electric detecting system comprising, two ferromagnetic cores having hysteresis characteristics substantially symmetrical with respect to their original point, an input winding having two input coils wound respectively on the cores and connected in series for applying simultaneously both an input signal and a reference standard signal, an exciting winding having one coil wound on one of the cores in the same winding direction as the input coil wound on the core and the other coil wound on the other core of the cores in the reverse winding direction to the input coil wound on said other core for applying a setting signal to remove the effect of the residual magnetism produced in the non-linear elements by preceding signals applied thereto and for applying an alternating-current exciting signal, said one and said other coil being connected in series, an output winding having two coils wound respectively on the cores in the same polarity as the input coils and connected in series for taking out an output signal having a frequency equal to the second high harmonic component of the exciting signal and one of two possible opposite phases in accordance with an algebraic sign of an algebraic difference between said input signal and said reference standard signal, said output winding being connected with a capacitor for resonating with the second high harmonic component.

5. An electric sign detecting system comprising, two ferromagnetic cores having hysteresis characteristics substantially symmetrical with respect to their original point, an input winding having two input coils wound respectively on the cores and connected in series for applying an input signal, a reference winding connected in said system identical to the input winding for applying a reference standard signal, an exciting winding having one coil wound on one of the cores in the same winding direction as the input coil wound on the core and the other coil wound on the other cores in the reverse winding direction to the input coil wound on the other core for applying a setting signal to remove the effect of the residual magnetism produced in the non-linear elements by preceding signals applied thereto and for applying an alternating-current exciting signal, said one and the other coil being connected in series, an output winding having two coils wound respectively on the cores in the same polarity as the input coils and connected in series for taking out an output signal having a frequency equal to the second high harmonic component of said exciting signal and one of two possible opposite phases in accordance with an algebraic sign of an algebraic difference between said input signal and the reference standard signal, a capacitor connected to said output winding for causing resonating with said second high harmonic component.

6. A plurality of electric sign detecting devices, in combination, each as claimed in claim 1, in which all of the windings other than said output winding are the same and said windings including said output winding are respectively connected to one another in series, said reference winding having a number of turns successively increasing whereby the input signal is converted to a signed signal quantized by a respective algebraic sign detecting device in the state of the particular phase of the second high harmonic of the exciting signal.

References Cited by the Examiner
UNITED STATES PATENTS

| | | | |
|---|---|---|---|
| 2,927,260 | 3/60 | Prywes | 307—88 |
| 2,948,818 | 8/60 | Eiichi Goto | 307—88 |
| 2,958,074 | 10/60 | Kilburn et al. | 340—174 |
| 2,968,028 | 1/61 | Eiichi Goto et al. | 340—174 |
| 2,990,521 | 6/61 | Shigeru Tominaga | 340—174 X |
| 3,098,157 | 7/63 | Enomoto et al. | 307—88 |

OTHER REFERENCES

Pages 308–316, 9/59, Publication I: "The Parametron Digital Computer MUSASINO-1," by Maroga and Takashima in IRE Transactions on Electronic Computers, vol. EC8, No. 3.

Pages 73–78, 6/60, Publication II: "Parametron Computer Circuits," by Nagamori in Electronics.

IRVING L. SRAGOW, *Primary Examiner.*